United States Patent
Koizumi et al.

(10) Patent No.: US 8,734,292 B2
(45) Date of Patent: May 27, 2014

(54) RATIO SHIFT CONTROL SYSTEM FOR AN AUTOMATIC TRANSMISSION

(71) Applicant: Suzuki Motor Corporation, Shizuoka (JP)

(72) Inventors: Shingo Koizumi, Shizuoka (JP); Satohiro Yoshida, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/899,105

(22) Filed: May 21, 2013

(65) Prior Publication Data

US 2013/0345021 A1    Dec. 26, 2013

(30) Foreign Application Priority Data

Jun. 26, 2012  (JP) ................................ 2012-142667

(51) Int. Cl.
*F16H 59/00*  (2006.01)
(52) U.S. Cl.
USPC ............................................................ 477/98
(58) Field of Classification Search
USPC .................................. 477/98, 115, 97; 701/51
See application file for complete search history.

(56) References Cited

U.S. PATENT DOCUMENTS

| 7,445,579 | B2* | 11/2008 | Kobayashi | 477/98 |
| 8,608,374 | B2* | 12/2013 | Hamama et al. | 374/109 |
| 2009/0118090 | A1* | 5/2009 | Heap et al. | 477/98 |
| 2010/0195693 | A1* | 8/2010 | Kitajima | 374/1 |

FOREIGN PATENT DOCUMENTS

JP  2009-228773 A  10/2009

* cited by examiner

*Primary Examiner* — David D Le
*Assistant Examiner* — David J Hlavka
(74) *Attorney, Agent, or Firm* — Rothwell, Figg, Ernst & Manbeck, P.C.

(57) ABSTRACT

A ratio shift control system for an automatic transmission calculates the magnitude of a difference in temperature between a detected engine coolant temperature and a detected outside air temperature, which are detected by coolant and outside air temperature sensors, respectively, during one engine start of an internal combustion engine. Ratio shift in the automatic transmission is controlled based on the detected outside air temperature during the one engine start when the magnitude of the difference in temperature is equal to or less than a predetermined cold engine evaluation threshold.

2 Claims, 4 Drawing Sheets

RATIO SHIFT CONTROL SYSTEM FOR AN AUTOMATIC TRANSMISSION

CROSS REFERENCE TO RELATED APPLICATION

The present application claims priority to Japanese Patent Application No. 2012-142667, filed on Jun. 26, 2012, the entire contents of which are hereby incorporated by reference for all purposes.

TECHNICAL FIELD

The present invention relates to a ratio shift control system for an automatic transmission, and particularly to a ratio shift control system which controls automatic ratio shift by getting an appropriate outside air temperature.

BACKGROUND

Automotive vehicles have realized the efficient run by an onboard automatic transmission which delivers a shaft torque of an internal combustion engine (or called "engine") to its output side propelling traction wheels while adjusting the number of rotations to the suitable one. This automatic transmission employs the detected temperature from an outside air temperature sensor to provide efficient transmission of power because it is necessary to adjust control conditions in response to outside air temperature and so forth.

It is the common practice to place such outside air temperature sensor in an engine compartment. Thus, the outside air temperature sensor is under the influence of radiant heat from the internal combustion engine, so that it cannot be expected that the outside air temperature sensor always detects outside air temperature appropriately. As one approach to remedy the influence of radiant heat, it is proposed by JP-A 2009-228773 to estimate an end-point temperature (or outside air temperature) of automatic transmission fluid.

In a ratio shift control system for an automatic transmission described in the above-mentioned JP-A 2009-228773, the measurement values of the engine coolant temperature at a current engine startup event and the previous event and the time elapsed from the previous event to the current event are employed to calculate a final end-point temperature (outside air temperature) as an estimate for the outside air temperature.

However, the engine coolant temperature, which varies depending on the engine running, does not completely match the fluctuation in outside air temperature. Thus, adjusting an operating condition of an automatic transmission according to the estimate (for outside air temperature) makes it difficult to provide an efficient and high quality drive control.

Such estimation may cause an inaccurate adjustment of the operating condition when an operating environment differs greatly, for example, from an intense cold region to an intense heat region between the previous event and the current event.

Incidentally, it might be possible to employ the detected temperature of an outside air temperature sensor as it is, provided that the engine coolant temperature has dropped to or below a cold engine evaluation threshold, because the outside air temperature sensor is placed in a so-called engine compartment together with an internal combustion engine and it is under the influence of radiant heat that is emitted according to an amount of time during which the internal combustion engine is in motion. Moreover, it might also be possible to employ a lower one of a current value detected at a current time and the previous value detected at the previous time when the engine coolant temperature exceeds the cold engine evaluation threshold.

However, when the operating environment differs greatly, for example, from the intense cold region to the intense heat region between the previous event and the current event, this control strategy would result in utilizing the temperature previously detected by the outside air temperature sensor in the intense cold region though it should have utilized the temperature detected by the outside air temperature sensor at the current event in the intense heat region. This makes it difficult to provide an efficient and high quality drive control.

If, taking such intense heat into consideration, the cold engine evaluation threshold were set high beforehand in order to solve this problem, the present temperature detected by the outside air temperature sensor under heavy influence of the radiant heat would be employed rather than the previously detected temperature closer to the actual outside air temperature. This makes it difficult to expect realization of an efficient and high quality drive control.

SUMMARY

Now, an object of the present invention is to provide a ratio shift control system for an automatic transmission, which is able to realize an efficient and high quality drive control even though operating environment differs greatly by determining the precision of an outside air temperature sensor exactly.

There is provided, according to a first aspect of the invention, a ratio shift control system for controlling an automatic transmission in a vehicle having, as a power source, an internal combustion engine, comprising: a coolant temperature sensor configured to detect an engine coolant temperature of the internal combustion engine; an outside air temperature sensor configured to detect an outside air temperature; and a ratio shift control configured to calculate the magnitude of a difference in temperature between a detected engine coolant temperature and a detected outside air temperature, which are detected by the coolant and outside air temperature sensors, respectively, during one engine start of the internal combustion engine and to control ratio shift in the automatic transmission based on the detected outside air temperature during the one engine start when the magnitude of the difference in temperature is equal to or less than a predetermined cold engine evaluation threshold.

According to a second aspect of the invention, in addition to the features recited in the above-mentioned first aspect, there is further a storage medium; and the ratio shift control causes the storage medium to store a detected outside air temperature detected by the outside air temperature sensor for at least one of another engine start and an engine shutdown of the internal combustion engine and controls ratio shift in the automatic transmission based on a lower one of the detected outside air temperature and the stored detected outside air temperature during the one engine start when the magnitude of the difference in temperature exceeds the predetermined cold engine evaluation threshold.

In this way, according to the above-mentioned first aspect of the invention, the outside air temperature sensor can detect outside air temperature with good approximation to reality because the amount of radiant hear from the internal combustion engine reduces to such a small level that the engine coolant temperature may get closer to the outside air temperature when the magnitude of the difference in temperature between coolant temperature and outside air temperature during the engine start is equal to or less than the predetermined cold engine evaluation threshold. Therefore, an efficient and high quality drive control is realized by controlling automatic ratio shift based on the outside air temperature.

According to the above-mentioned second aspect of the invention, it is possible to control automatic ratio shift in the automatic transmission based on a lower one of an outside air temperature detected during the current engine start and the previously employed outside air temperature when the magnitude of the difference in temperature between coolant temperature detected at the current engine start and the outside air temperature detected at the current engine start exceeds the predetermined cold engine evaluation threshold because it is determined that the detected coolant temperature is subject to an increase in temperature under the influence of increased amount of radiant heat from the internal combustion engine and the detected outside temperature is subject to an increase in temperature to indicate a level higher than the actual outside air temperature. Therefore, an efficient and high quality drive control is realized by controlling automatic ratio shift using the detected outside air temperature which is least affected by the engine radiant heat and maintained with good approximation to the actual outside air temperature under the influence of outside air temperature at the engine start or natural ventilation.

DETAILED DESCRIPTION

Figure 1:
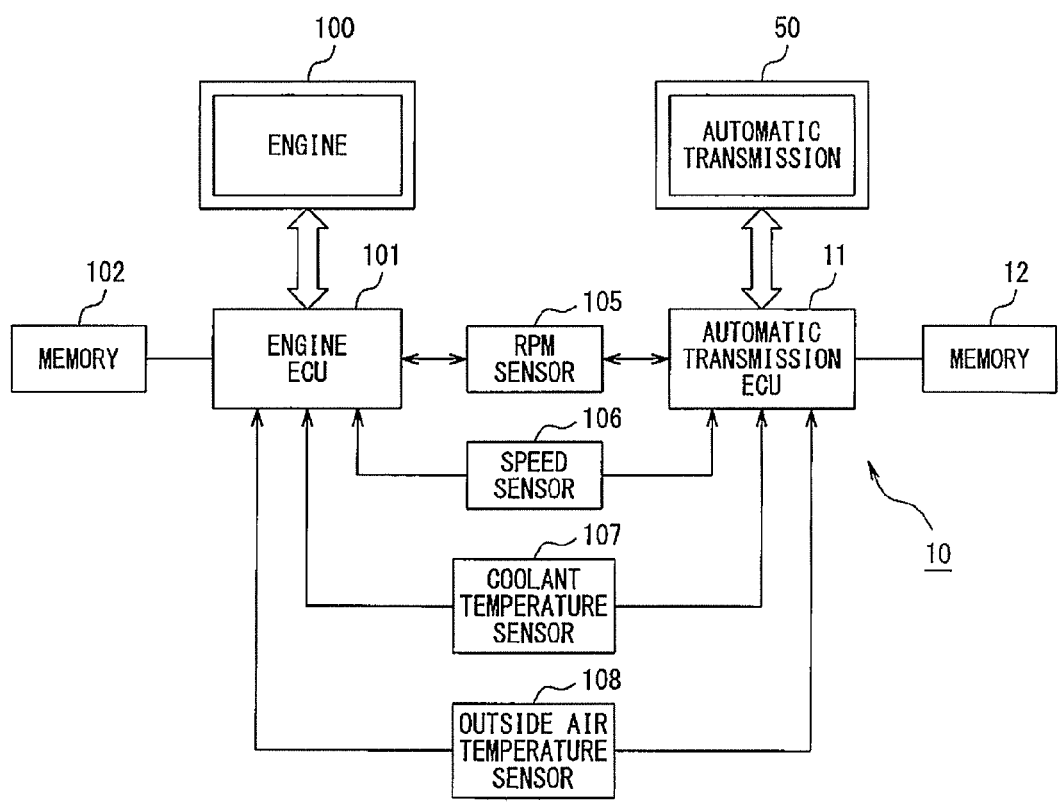
FIG. 1 is a block diagram of overall structure illustrating one embodiment of a ratio shift control system for an automatic transmission according to the present invention.
Figure 2:
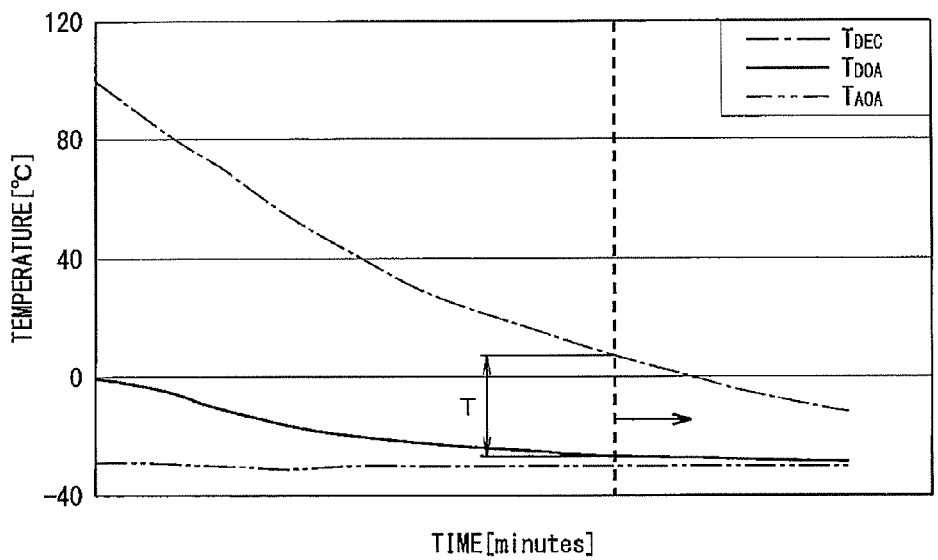
FIG. 2 is a graphical presentation of changes of various parameters over time.

Hereinafter, referring to the drawings, an embodiment of the present invention is described in detail. FIGS. 1 to 5 are views illustrating one embodiment of a ratio shift control system for an automatic transmission according to the present invention.

Referring to FIG. 1, a ratio shift control system 10 is configured to control operation of an automatic transmission that is mounted in an automotive vehicle together with an engine (or internal combustion engine) that is operable on gasoline. The automatic transmission is configured to automatically shift into one of multiple ratios between an input speed of rotation of an output shaft of the engine and an output speed for delivering a shaft torque of the engine to a rotating shaft on its outside side for propelling traction wheels to realize motion of the vehicle.

Now, the engine can provide power by rotating its output shaft by one or more pistons due to conversion of a linear movement of each piston in a cylinder between the bottom and top of the cylinder into a rotating movement via a crankshaft by introducing gasoline under pressure by injection into a combustion chamber in the cylinder together with air, and heating the charge by ignition and combustion to expand and push the piston to the bottom of the cylinder. The constituent elements 100 like, for example, injectors for the fuel injection, of the engine system required to operate the engine are driven by executing overall control based on various parameters by executing an engine control program stored in a memory 102 by an engine electronic control unit (ECU) 101.

Engine ECU 101 is connected to various sensors including an rpm sensor 105, a speed sensor 106, a coolant temperature sensor 107 and an outside air temperature sensor 108 in such a way as to receive the detected information by each of the various sensors. Based on the detected information by each of the various sensors and stored data in the memory 102, this engine ECU 101 causes the engine to run under optimal operating conditions for driving conditions according to a driver's input via an accelerator pedal and a gear ratio selected in an automatic transmission later described.

The rpm sensor 105 is so arranged as to detect revolutions per minute of the engine output shaft. The speed sensor 106 is so arranged as to detect the vehicle speed by detecting rpm of the rotating shaft on the output side propelling the traction wheels. The coolant temperature sensor 107 is so arranged as to detect the temperature of coolant in a radiator for cooling the engine. The outside air temperature sensor 108 is so arranged as to detect ambient temperature as driving environment around the vehicle.

Among them, comparing to the other various sensors 105, 106 and 107 which are so arranged at the optimal positions as to accurately get the desired pieces of information, respectively, the outside air temperature sensor 108 is placed inside the engine compartment at a less optimal position in natural ventilation because it is likely to receive mechanical damage from outside if it is attached to the outer surface of the vehicle exterior body at the most optimal position in natural ventilation.

Moreover, the automatic transmission, lying between the engine output shaft and the rotating shaft on the output side propelling the traction wheels, includes a system for automatic regulation of a gear ratio during delivering shaft torque from the engine output shaft to the rotating shaft in response to speed of the engine (rpm) and travelling speed of the vehicle (rpm). The automatic transmission according to the present embodiment is constructed to take the form of a so-called dual clutch transmission (DCT), i.e., a geared mechanism having input clutches and various gears divided into two power paths, one associated with the odd numbered gears, the other associated with the even numbered gears, to engage one clutch and a selected gear in response to a ratio shift command. This DCT produces ratio shifts by repeating control of preparing two power paths and engaging one power path with the other power path disengaged, and thus the time required for each gear ratio shift can be shortened because the DCT always prepares the other flow path while engaging the one flow path.

Moreover, in the DCT, the ratio shift control system 10 employs automatic control for engaging the input clutches and selecting gears (DCT may employ manual control). The ratio shift control system 10 is configured to exercise ratio shift control, called so-called semi-automatic transmission (semi-AT) in such a way as to effect engagement of the input clutches and selective switching among the gears smoothly without any unpleasant shift shock imparted to the vehicle occupant.

Ratio shift control system 10 executes overall control of constituent elements 50 of the automatic transmission system provided for executing various control processes including the clutch engagement and the switching of gear selection based on various parameters by executing ratio shift control program stored in the memory 12 of the automatic transmission ECU 11.

Automatic transmission ECU 11 is connected to various sensors including rpm sensor 105 and speed sensor 106 in such a way that the automatic transmission ECU 11 and engine ECU 101 receive in common the detected information by each of the various sensors.

Based on the detected information by each sensor and the stored data in the memory 12, this automatic transmission ECU 11 controls the operating conditions of automatic transmission in accordance with driving conditions established by a driver's input via an accelerator pedal and a driver's input via a shift lever to execute ratio shift control, including up-shifts and down-shifts, by making input clutch operation smoothly.

Automatic transmission ECU 11 is connected to coolant temperature sensor 107 and outside air temperature sensor 108 in such a way that the automatic transmission ECU 11 and engine ECU 101 receive in common the detected information by each of the sensors. This automatic transmission ECU 11 is configured to optimize a clutch control for adjusting a degree of engagement of each of the input clutches of the automatic transmission in response to detected temperature information because friction behavior of clutch plate varies with changes in ambient temperature. That is, the ratio shift control system 10 includes a coolant temperature sensor 107 and an outside air temperature sensor 108 in addition to the automatic transmission ECU 11, memory 12, rpm sensor 105 and speed sensor 106.

In concrete terms, automatic transmission ECU 11 provides smooth ratio shift operation by adjusting the degree of engagement of clutch to changes in ambient temperature, and it determines whether or not detected temperature information from outside air temperature sensor 108 should be employed as ambient temperature based on detected temperature information from coolant temperature sensor 107.

Incidentally, this outside air temperature sensor 108 is subject to heat under the influence of radiant heat that is caused by operation of the engine because it is placed in the engine compartment, but it is able to detect outside air temperature as high as ambient temperature because, to some extent, it is in natural ventilation while the engine is running.

In addition, the outside air temperature sensor 108 acquires temperature information that varies in the same manner as detected temperature information from the coolant temperature sensor 107 does after the engine is shutdown (or the vehicle is deactivated) because it is placed in the engine compartment. Specifically, in one example shown in FIG. 2, upon elapse of a period of time after the engine shutdown, the outside air temperature sensor 108 will detect outside air temperature that may be considered as almost equivalent to ambient temperature (with a temperature difference of not greater than five degrees Centigrade, for example) even though the actual outside air temperature in the surroundings remains unchanged.

Figure 3:
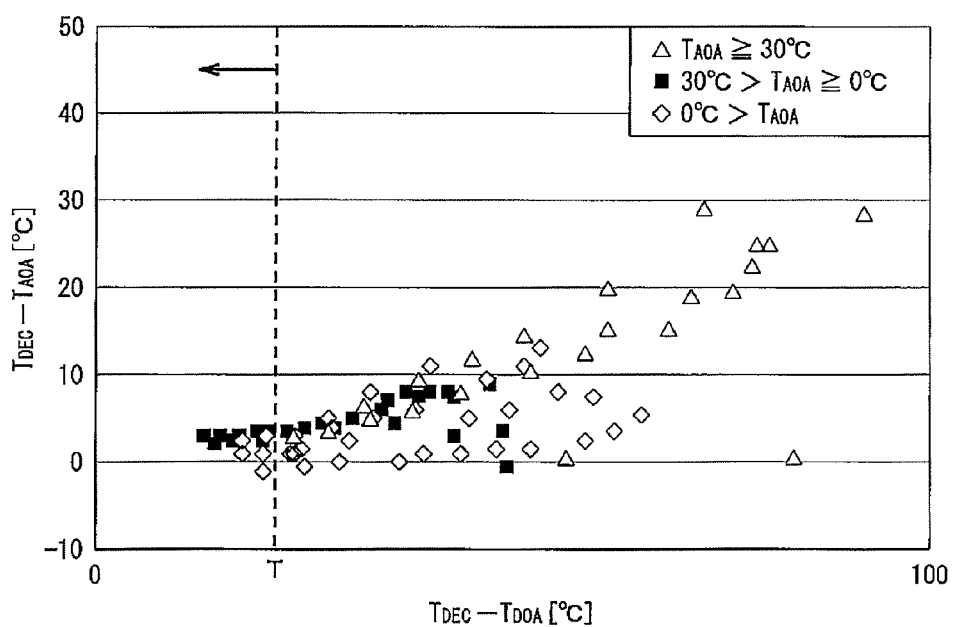
FIG. 3 is a graphical presentation of relationships among the parameters.

For example, as shown in FIG. 3, the detected coolant temperature $T_{DEC}$ from the coolant temperature sensor 107 and the actual outside air temperature $T_{AOA}$, that is, the actual ambient temperature, have a correlation and the detected coolant temperature $T_{DEC}$ and the detected outside air temperature $T_{DOA}$ from the outside air temperature sensor 108 have a correlation. Entering into details, it becomes clear that not only in a high-temperature region where the actual outside air temperature $T_{AOA}$ is equal to or higher than 30 degrees Centigrade and a low-temperature region where the actual outside air temperature $T_{AOA}$ is lower than 0 degrees Centigrade, but in a middle-temperature region where the actual outside air temperature $T_{AOA}$ is equal to or higher than 0 degrees Centigrade but lower than 30 degrees Centigrade, the larger the magnitude of a difference in temperature (a temperature difference) resulting from subtracting the detected outside air temperature $T_{DOA}$ provided by the outside air temperature sensor 108 from the detected coolant temperature $T_{DEC}$ provided by the coolant temperature sensor 107, the larger the magnitude of a deviation in temperature of the detected coolant temperature $T_{DEC}$ or the detected outside air temperature $T_{DOA}$ from the actual outside air temperature $T_{AOA}$. In other words, when the magnitude of the difference in temperature resulting from subtracting the detected outside air temperature $T_{DOA}$ provided by the outside air temperature sensor 108 from the detected coolant temperature $T_{DEC}$ provided by the coolant temperature sensor 107 is less than or equal to a predetermined cold engine evaluation threshold T, the detected outside air temperature $T_{DOA}$ provided by the outside air temperature sensor 108 may be employed because it is considered to be equal to the outside air temperature $T_{AOA}$ in the surroundings. For this reason, it is clear from FIG. 2 that the detected outside air temperature $T_{DOA}$ provided by the outside air temperature sensor 108 may be employed as the actual outside air temperature $T_{AOA}$ when the magnitude of the difference in temperature becomes equal to or less than the predetermined cold engine evaluation threshold T, upon elapse of a period of time after the engine shutdown, i.e., at the moment as indicated by the broken vertical line.

Accordingly, automatic transmission ECU 11 is configured to hold, in advance, the detected temperature information from the outside air temperature sensor 108 which may be employed as an actual outside air temperature for an engine start and the detected temperature information from the outside air temperature sensor 108 which may be employed as an actual outside air temperature for an engine shutdown as storage data in the memory 12 based on the detected information (engine rpm) from the rpm sensor 105 by executing the ratio shift control program stored in the memory 12.

Then, this automatic transmission ECU 11 determines, upon determining one engine start based on the engine rpm detected by the rpm sensor 105, which one of the detected outside air temperature $T_{DOA}$ information may be employed as an actual outside air temperature $T_{AOA}$ in response to the detected coolant temperature $T_{DEC}$ information from the coolant temperature sensor 107 and that $T_{DOA}$ from the outside air temperature sensor 108. During a warm-up period of the engine when the detected outside air temperature $T_{DOA}$ information from the outside air temperature sensor 108 may not be employed as the actual outside air temperature $T_{AOA}$, then, the automatic transmission ECU 11 reads out that detected temperature $T_{DOA}$ information from the outside air temperature sensor 108 which was held or stored in the memory 12 during the previous engine start or shutdown (vehicle being deactivated) and employs a lower one of the detected temperature information as the actual outside air temperature $T_{AOA}$. That is, the automatic transmission ECU 11 constitutes a ratio shift control, the memory 12 constitutes an outside air storage medium and the rpm sensor 105 constitutes an operation detection.

Figure 4:
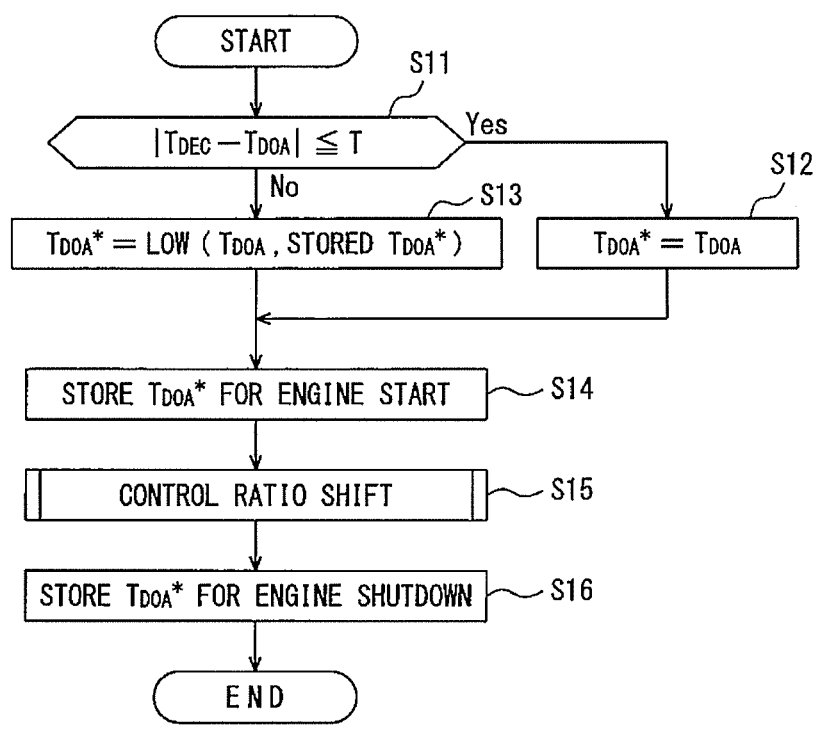
FIG. 4 is a flow chart illustrating switching between parameters employed for ratio shift.

Entering into details, as illustrated by the flow chart shown by FIG. 4, immediately after determining an engine start based on the engine rpm detected by the rpm sensor 105, the automatic transmission ECU 11 determines whether or not the magnitude of a difference in temperature resulting from subtracting the detected outside air temperature $T_{DOA}$ provided by the outside air temperature sensor 108 from the detected coolant temperature $T_{DEC}$ provided by the coolant temperature sensor 107 is equal to or less than the predetermined cold engine evaluation threshold T (step S11). When the magnitude of the difference in temperature is less than the cold engine evaluation threshold T, the detected outside temperature $T_{DOA}$ from the outside air temperature sensor 108 is employed as an outside air temperature $T_{AOA}$ in the surroundings (step S12). When the magnitude of the difference in temperature is greater than the cold engine evaluation threshold T, the detected outside air temperature $T_{DOA}$ from the outside air temperature sensor 108 is compared to the previously detected outside air temperatures $T_{DOA}$, which were detected by the outside air temperature sensor 108 and held as storage data in the memory 12 for an engine start and an engine shutdown of the previous engine operation, and the lowest one of them is employed as an outside air temperature in the surroundings for a current engine start, called "an employed detected outside air temperature $T_{DOA}*$ for engine start" (step S13). In addition, environmental conditions may cause the outside air temperature to exceed the coolant temperature, and this is the reason why the magnitude of the difference in temperature is used at step S11 to provide an easy and reliable judgment result.

Next, the automatic transmission ECU 11 holds an outside air temperature, which has been employed for the current engine start ($T_{DOA}*$), stored in the memory 12 (step S14) and performs smooth ratio shift operation by effecting clutch engagement in a manner suitably adjusted to the above-mentioned outside air temperature (step S15). Then, after the vehicle has begun travelling, the automatic transmission ECU 11 obtains from the outside air temperature sensor 108 the detected temperature $T_{DOA}$ information, which may be considered to be made equal to the actual outside air temperature $T_{AOA}$ under the influence of the natural ventilation, to perform ratio shift operation by effecting clutch engagement.

Subsequently, whenever it is determined based on vehicle speed detected by the speed sensor 106 that the vehicle has stopped, the automatic transmission ECU 11 holds the detected temperature $T_{DOA}$ information from the outside air temperature sensor 108 temporarily in the memory 12 to update it on the detected temperature $T_{DOA}$ information, holding the latest outside air temperature $T_{DOA}$ in the memory 12 upon determining an engine shutdown based on the engine RPM detected by the RPM sensor 105 at the appropriate location in the memory 12 as an outside air temperature for the engine shutdown, called "an employed detected outside air temperature $T_{DOA}*$ for engine shutdown" (step S16) before this routine ends. This enables storing the detected outside air temperature which has been made closer to the actual outside air temperature $T_{DOA}$ by natural ventilation as an employed outside air temperature for the engine shutdown $T_{DOA}*$.

Figure 5:
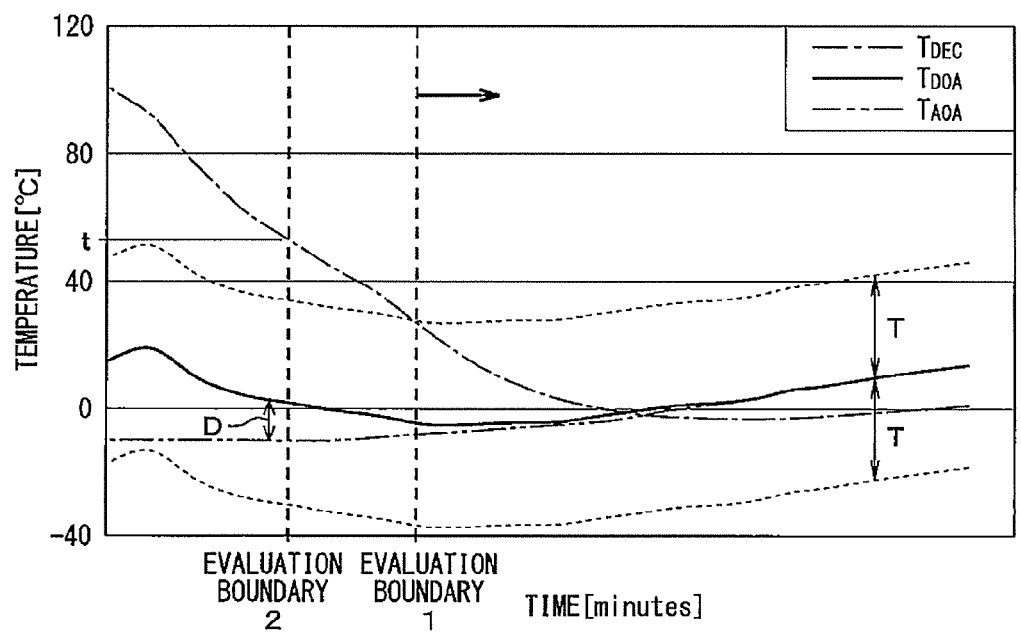
FIG. 5 is a graphical presentation of the effect.

As shown in FIG. 5, this causes the ratio shift control 10 to employ that detected outside air temperature from the outside air temperature sensor 108 which is considered to be equal to actual outside air temperature for control of clutch engagement upon or immediately after crossing an evaluation boundary 1 or after the difference in temperature resulting from subtracting the detected outside air temperature provided by the outside air temperature sensor 108 from the detected coolant temperature provided by the coolant temperature sensor 107 has become equal to or less than the cold engine evaluation threshold T. If, for example, a threshold t is employed for comparison to only the detected coolant temperature provided by the coolant temperature sensor 107, the outside air temperature provided by the outside air temperature sensor 108 differs appreciably from the actual outside air temperature by a difference D in temperature when or immediately after the detected coolant temperature becomes equal to the threshold t as indicated by an evaluation boundary 2 in FIG. 5, but this is prevented from being employed as the actual outside air temperature according to the above-mentioned strategy. Therefore, operation for a smooth ratio shift may be performed by avoiding the situation where it becomes unable to effect engagement of clutch in a manner suitably adjusted to friction behavior responsive to temperature in the surroundings because the detected outside air temperature provided by the outside air temperature sensor 108 differs appreciably from actual outside air temperature.

Thus, in the present embodiment, when, during an engine start, the difference in temperature between the detected coolant temperature and the detected outside air temperature is equal to or less than the cold engine evaluation threshold T, this detected outside air temperature is considered to be equal to the actual outside air temperature and may be employed to adjust operation for clutch engagement. Therefore, effecting clutch engagement in response to the outside air temperature, i.e. the actual temperature in the surroundings, makes it possible to appropriately perform ratio shift operation that is suited to friction behavior of clutch, providing an efficient high quality drive control.

When, on the other hand, this difference in temperature between the detected coolant temperature and the detected outside air temperature exceeds the cold engine evaluation threshold T, the outside air temperature previously employed for an engine start or an engine shutdown is employed to adjust operation for clutch engagement. Using the outside air temperature for an engine start or the stored outside air temperature considered to be made equal to the actual outside air temperature by the natural, which, if at all possible, are not under the influence of radiant heat from engine, makes it possible to appropriately perform ratio shift operation (clutch engagement), providing an efficient high quality drive control.

With regard to other modes of the present embodiment, it will be appreciated here that the present embodiment described in the case where outside air temperature to be employed is selected from detected outside air temperatures detected during the previous engine start and shutdown is not to be considered in a limiting sense because other modes are possible. For example, one of the detected outside temperatures during the previous engine start and shutdown can be stored to provide the same effect.

In addition, the present embodiment described in the case where the above technology is applied to a ratio shift control for a DCT is not to be considered in a limiting sense because numerous applications of this technology are possible. It goes without saying that the technology may be applied to the automatic transmission using hydraulic fluid as described in JP-A2009-228773. In addition, the technology may be applied preferably to such control that employs, as a parameter, the detected outside temperature from the outside air temperature sensor 108.

The present invention is not to be limited to the exemplary embodiment illustrated and described, but it is considered to embrace all possible embodiments providing equivalent effect which the present invention aims at. Moreover, the present invention is not to be limited to possible combinations of inventive features defined by individual claims, but it shall include all desired combinations of specific features among all of various features disclosed.

Having described one embodiment of the present invention, it goes without saying that the present invention is not limited to the above-mentioned embodiment, but it may be implemented in numerous different variations within the subject matter of the present invention.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through prosecution of new claims in this or a related application. Such claims, whether broader, narrower, equal, or different in scope to the original claims, also be regarded as included within the subject matter of the present disclosure.

The invention claimed is:

1. A ratio shift control system for controlling an automatic transmission in a vehicle having, as a power source, an internal combustion engine, comprising:
    a coolant temperature sensor configured to detect an engine coolant temperature of the internal combustion engine;
    an outside air temperature sensor configured to detect an outside air temperature; and
    a ratio shift control configured to calculate the magnitude of a difference in temperature between a detected engine coolant temperature and a detected outside air temperature, which are detected by the coolant and outside air temperature sensors, respectively, during one engine start of the internal combustion engine and to control ratio shift in the automatic transmission based on the detected outside air temperature during the one engine start when the magnitude of the difference in temperature is equal to or less than a predetermined cold engine evaluation threshold.

2. The system according to claim 1,
further comprising a storage medium; and
wherein the ratio shift control causes the storage medium to store a detected outside air temperature detected by the outside air temperature sensor for at least one of another engine start and an engine shutdown of the internal combustion engine and controls ratio shift in the automatic transmission based on a lower one of the detected outside air temperature and the stored detected outside air temperature during the one engine start when the magnitude of the difference in temperature exceeds the predetermined cold engine evaluation threshold.

* * * * *